(12) United States Patent
Werjefelt et al.

(10) Patent No.: US 10,215,991 B2
(45) Date of Patent: Feb. 26, 2019

(54) HAND-HELD EMERGENCY VISION APPARATUS AND SYSTEM

(71) Applicants: Bertil R. L. Werjefelt, Kaneohe, HI (US); Christian Werjefelt, Kaneohe, HI (US); Alexander K. Werjefelt, Kaneohe, HI (US)

(72) Inventors: Bertil R. L. Werjefelt, Kaneohe, HI (US); Christian Werjefelt, Kaneohe, HI (US); Alexander K. Werjefelt, Kaneohe, HI (US)

( * ) Notice: Subject to any disclaimer, the term of this patent is extended or adjusted under 35 U.S.C. 154(b) by 0 days.

(21) Appl. No.: 15/390,299

(22) Filed: Dec. 23, 2016

(65) Prior Publication Data

US 2017/0235149 A1 Aug. 17, 2017

Related U.S. Application Data

(60) Provisional application No. 62/273,528, filed on Dec. 31, 2015, provisional application No. 62/303,788, filed on Mar. 4, 2016.

(51) Int. Cl.
| | |
|---|---|
| *B64D 11/00* | (2006.01) |
| *G02B 27/04* | (2006.01) |
| *B64D 25/00* | (2006.01) |
| *B64D 45/00* | (2006.01) |
| *G02B 23/00* | (2006.01) |
| *B01D 46/10* | (2006.01) |
| *G02B 27/02* | (2006.01) |

(Continued)

(52) U.S. Cl.
CPC ............. *G02B 27/04* (2013.01); *B01D 46/10* (2013.01); *B01D 46/103* (2013.01); *B64D 25/00* (2013.01); *B64D 43/00* (2013.01); *B64D 45/00* (2013.01); *G02B 23/00* (2013.01); *G02B 27/0006* (2013.01); *G02B 27/022* (2013.01); *G02B 27/028* (2013.01)

(58) Field of Classification Search
CPC ................................ G02B 27/00; B64D 11/00
USPC ....... 359/894, 817, 826, 696, 406, 408, 506, 359/612; 244/118.5
See application file for complete search history.

(56) References Cited

U.S. PATENT DOCUMENTS

| | | | |
|---|---|---|---|
| 4,832,287 A * | 5/1989 | Werjefelt .................. | B60R 1/00 244/118.5 |
| 5,144,493 A | 9/1992 | Nomura | |
| 5,631,772 A | 5/1997 | Mizukawa | |

(Continued)

OTHER PUBLICATIONS

The International Bureau of WIPO, International Search Report and Written Opinion of the International Searching Authority, dated Mar. 30, 2017, PCT/US16/68571.

*Primary Examiner* — Audrey Y Chang
(74) *Attorney, Agent, or Firm* — Shlesinger, Arkwright & Garvey LLP (57) ABSTRACT

A hand-held emergency vision apparatus comprises an enclosed tubular structure having opposite first and second ends; first and second clear members disposed at respective the first and second ends; the structure including a plurality of tubular members retractable to a shorter length and extendable to one of several lengths, the tubular members are rigid and sealed from the outside air; and a filter operably associated with the tubular structure to filter the outside air such that when the tubular structure is extended from the compact form air the outside air is forced through the filter and clean air enters the tubular structure.

18 Claims, 12 Drawing Sheets

(51) Int. Cl.
*B64D 43/00* (2006.01)
*G02B 27/00* (2006.01)

(56) References Cited

U.S. PATENT DOCUMENTS

| | | | | |
|---|---|---|---|---|
| 5,947,415 | A | 9/1999 | Werjefelt | |
| 6,191,899 | B1 * | 2/2001 | Fuchs | A62B 3/00 |
| | | | | 206/803 |
| 6,460,804 | B2 * | 10/2002 | Werjefelt | B64C 1/1476 |
| | | | | 244/118.5 |
| 6,822,810 | B2 * | 11/2004 | Ichino | G02B 15/14 |
| | | | | 359/696 |
| 7,583,455 | B2 * | 9/2009 | Werjefelt | A62B 99/00 |
| | | | | 244/118.5 |
| 7,639,936 | B2 * | 12/2009 | Lin | G03B 13/34 |
| | | | | 348/294 |
| 8,213,101 | B2 | 7/2012 | Werjefelt | |
| 8,453,969 | B2 * | 6/2013 | Werjefelt | B64D 25/00 |
| | | | | 244/118.5 |
| 2010/0014160 | A1 | 1/2010 | Yang | |
| 2013/0296145 | A1 | 11/2013 | Tomaszewski | |

\* cited by examiner

FIG. 27 ial Appli-
HAND-HELD EMERGENCY VISION APPARATUS AND SYSTEM

RELATED APPLICATIONS

This is a nonprovisional application of Provisional Application Ser. Nos. 62/273,528 filed Dec. 31, 2015 and 62/303,788 filed Mar. 4, 2016, both of which are hereby incorporated by reference.

FIELD OF THE INVENTION

The present invention is generally directed to an apparatus to enable an operator to maintain visual contact with instruments or other visual sources of data after smoke and/or particulate from a fire or other sources has invaded the operator's environment. In particular, the present invention relates to a system that provides a clear view outside an aircraft cockpit and of the instrument panel, relevant checklist, approach plate, keyboard, circuit breakers, fuses, control panel, etc., thereby providing a pilot with vital information for guiding the aircraft to a safe landing after smoke and/or particulate matter invades the cockpit area.

BACKGROUND OF THE INVENTION

When cockpits are invaded by continuous, dense, blinding smoke that turn airplanes into unguided missiles, the results are well known to be catastrophic and fatal for passengers and crew. None creates an unsafe condition faster than a pilot blinded by continuous, opaque smoke. And none occurs as frequently as smoke in the cockpit. According to the Air Line Pilots Association, airliners make an unscheduled or emergency landing due to smoke in the cockpit on an average of once per day.

What is true for a cockpit is equally true for any operator station where the operator's ability to see the instrument panel when smoke invades the operator's station depends on the safe operation or orderly shutdown of critical processes, such as occur in a nuclear power station, submarine and similar operator stations.

SUMMARY OF THE INVENTION

The present invention provides a hand-held emergency vision apparatus comprising an enclosed tubular structure having opposite first and second ends; first and second clear members disposed at respective the first and second ends; the structure including a plurality of tubular members retractable to a shorter length and extendable to one of several lengths, the tubular members are rigid and sealed from the outside air; and a filter operably associated with the tubular structure to filter the outside air such that when the tubular structure is extended from the compact form air the outside air is forced through the filter and clean air enters the tubular structure.

DETAILED DESCRIPTION OF THE INVENTION

Figures 1, 5:
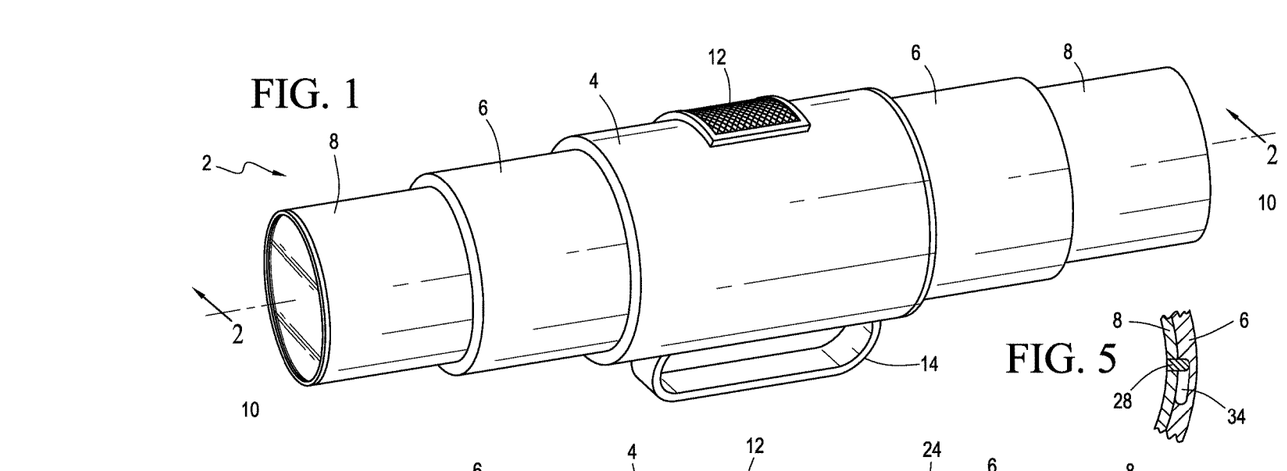
FIG. 1 is a perspective view of a hand-held emergency vision device embodying the present invention, shown in an extended position.
FIG. 5 is an enlarged cross-section view along line 5-5 in FIG. 4.

A hand-held emergency vision device 2 embodying the present invention is disclosed in FIG. 1. The device 2 is in a sealed tubular form made of a plurality of tubular members 4, 6 and 8. The tubular members are preferably made of lightweight rigid plastic. Clear members 10 are disposed at opposite ends of the device 2 to allow a user to see through the device in the presence of smoke in the environment. A filter 12, in communication with the interior of the device 2 and the outside, is preferably disposed on the tubular member 4. The filter 12 is advantageously used to filter smoke from the air in the environment so that clear air is introduced inside the device when the device is expanded for use. A handle 14 is attached to the tubular member 4 for the user's convenience. The tubular members may be made of clear or translucent material to provide the outside ambient lighting to reach inside the device and provide lighting toward the object being viewed.

Figure 2:
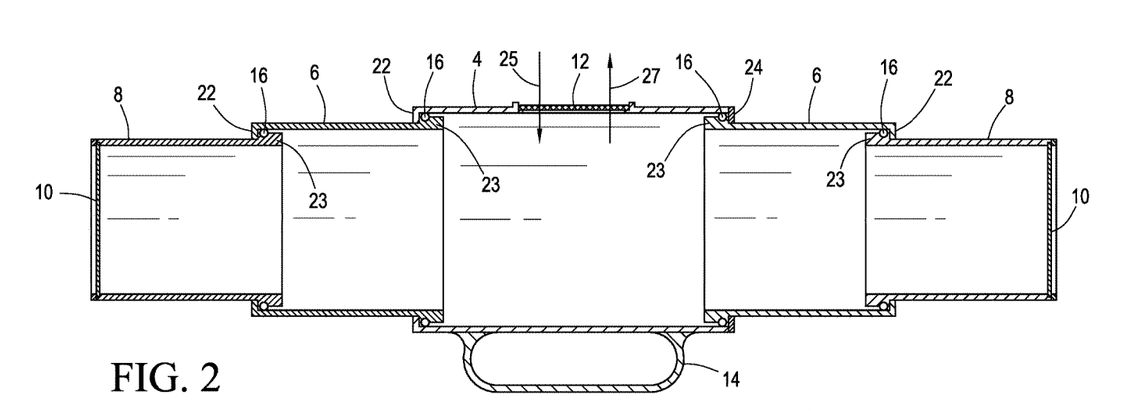
FIG. 2 is a cross-sectional view along line 2-2 in FIG. 1.

Referring to FIG. 2, the tubular members 8 are retractable into or extendable from respective tubular members 6, which are retractable into or extendable from the tubular members 4. Seals 16, preferably O-rings, advantageously make the interior of the device airtight to force air to flow through the filter 12 when the device is expanded or retracted. When the device 2 is retracted, the air inside the device is forced through the filter 12, advantageously purging the filter 12 of the trapped smoke particles. The seals 16 advantageously keep the tubular members 8 sealed against the inner surface of the tubular members 6. Similarly, the seals 16 advantageously keep the tubular members 6 sealed against the inner surface of the tubular member 8.

Referring to FIG. 2, the tubular member 4 at one end includes an inwardly disposed shoulder 22, preferably circumferential, that cooperates with outwardly projecting shoulder 23, preferably circumferential, to provide a stop for one of the tubular members 6 when it is being extended. A removable shoulder 24 at the other end of the tubular member 4, in cooperation with another outwardly projecting shoulder 23 provides a stop for the other tubular member 6. The removable shoulder 24, preferably a ring, is attached to the tubular member 4 with screws or standard means after both of the tubular members 6 are installed inside the tubular member 8. The removable shoulder 24 facilitates the assembly of the device 2; however, other means may be provided, such as forming the tubular member 4 in two halves and then joining the halves together with standard means after the tubular members 6 have been placed inside the tubular member 4. The tubular members 8 are also provided with respective outwardly projecting shoulders 23 that cooperate with corresponding inwardly projecting shoulders 22 to provide a stop between the respective tubular members 6 and 8 when being extended. The seals 16 are disposed in respective shoulders 23 in respective annular grooves.

Figure 3:
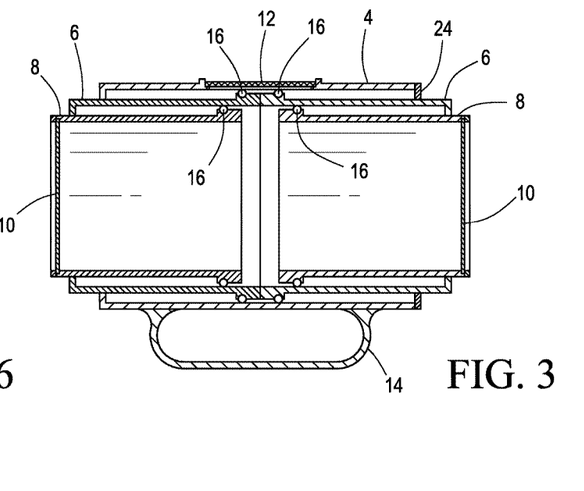
FIG. 3 is a cross-sectional view similar to FIG. 2, showing the device in a retracted position.

Air from the outside of the device 2 is drawn into the interior of the device 2, as generally shown at 25, when the device is extended for use. When the device 2 is retracted, as shown in FIG. 3, air from the inside is forced to the outside, as generally indicated at 27, advantageously purging the smoke particles trapped by the filter 12.

Figure 4:
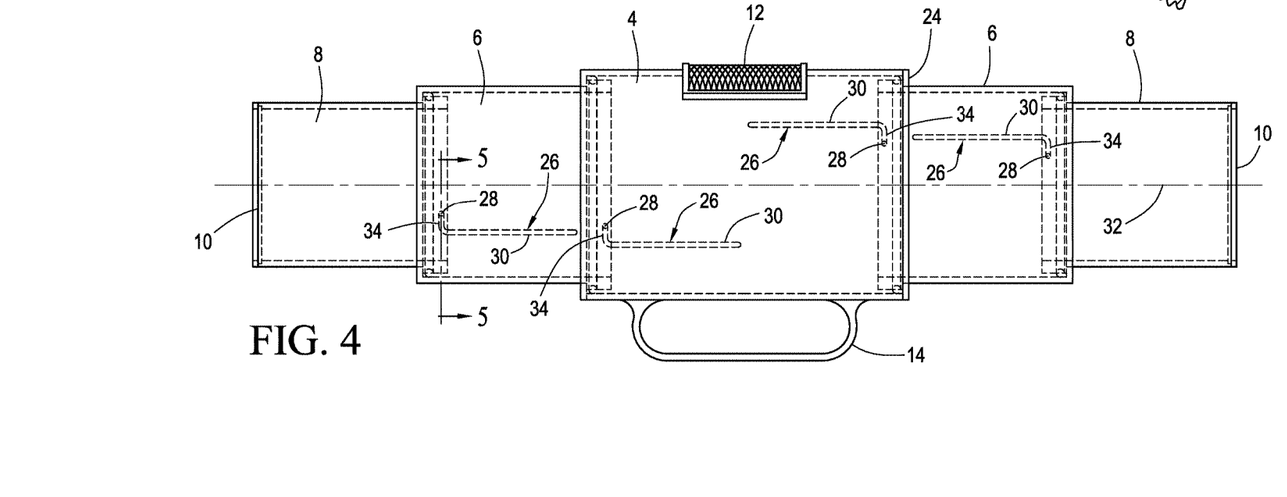
FIG. 4 is a side elevational view of FIG. 1.

Referring to FIGS. 4 and 5, L-shaped grooves 26 are disposed on respective inner surfaces of the tubular members 4 and 6. Pins 28 are attached to the respective tubular members 6 and 8. The pins 28 project outside the wall of the respective tubular members 6 and 8 and are received in the respective grooves 26. The pins 28 and the grooves 26 advantageously guide the tubular members during retraction or extension. Each of the grooves 26 includes a longitudinal portion 30, which is preferably parallel to the longitudinal axis 32 and a transverse portion 34, which is preferably circumferential. Positioning the pins 28 in the respective transverse portions 34 of the grooves 26 advantageously locks the tubular member 6 and 8 at the extended positions, thereby preventing inadvertent retraction.

Figure 6:
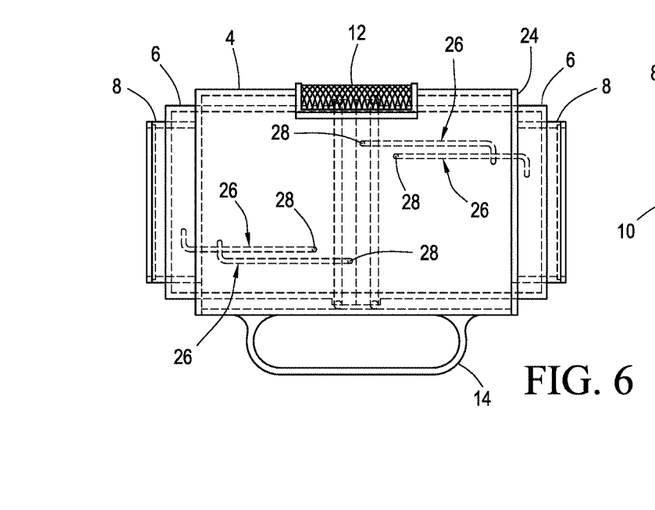
FIG. 6 is a side elevational view of the device shown in FIG. 1, shown in a retracted position.

Referring to FIG. 6, the respective ends of the longitudinal portions 30 of the grooves 26 provide a stop for the pins 28 when the tubular members 6 and 8 are retracted. The stop ensures a positive limit to how far the tubular members can be retracted.

Figures 7, 8, 9, 10:
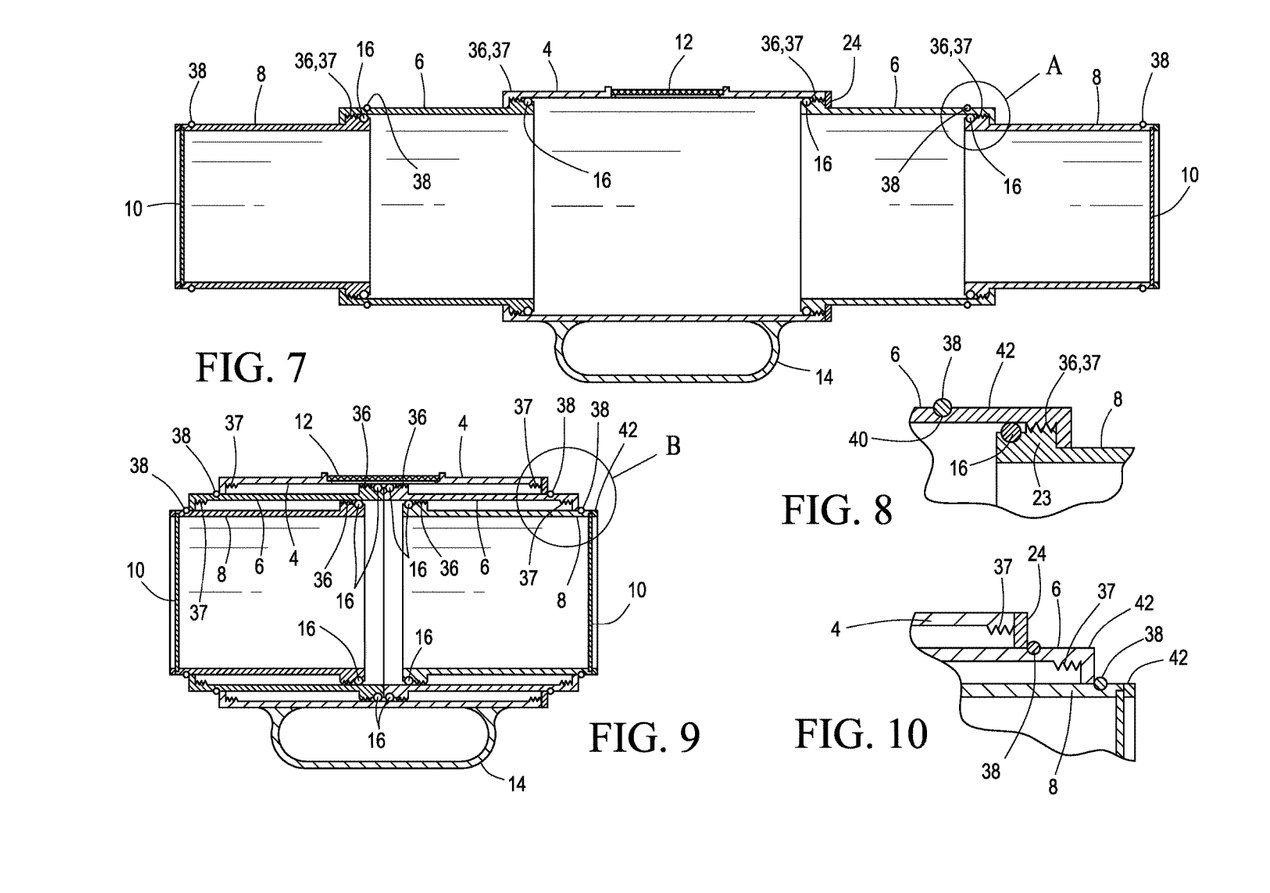
FIG. 7 is a longitudinal cross-sectional view of another embodiment of the present invention, showing the device in an extended position.
FIG. 8 is an enlarged cross-sectional view of detail A in FIG. 7.
FIG. 9 is a cross-sectional view similar to FIG. 7, showing the device in a retracted position.
FIG. 10 is an enlarged cross-sectional view of detail B in FIG. 9.

Referring to FIGS. 7 and 8, in lieu of the grooves 26, cooperating male threads 36 and female threads 37 are provided for the tubular members 4 and 6 and female threads 37 for the tubular member 8 at their respective end portions such that when the tubular members 6 and 8 are extended, the respective threads are threaded together to maintain the tubular members in the extended position.

Referring to FIGS. 9 and 10, split rings 38 are disposed on respective annular grooves 40 on respective outside surfaces 42 of the tubular members 6 and 8. The split rings 38 protrude above the respective outside surfaces 42 to provide a stop against the respective edge portions of the respective tubular members 4 and 6, as shown in FIG. 10. Other standard means for providing a stop for preventing the tubular members 6 and 8 from retracting too far into the corresponding outer tubular members may be provided.

Figure 11:
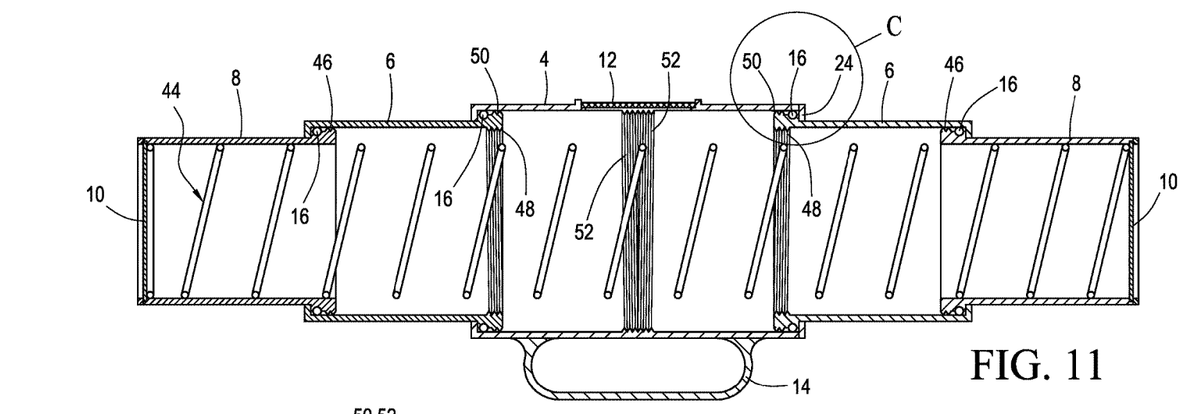
FIG. 11 is a longitudinal cross-sectional view of another embodiment of the present invention, showing the device in an extended position.
Figure 12:
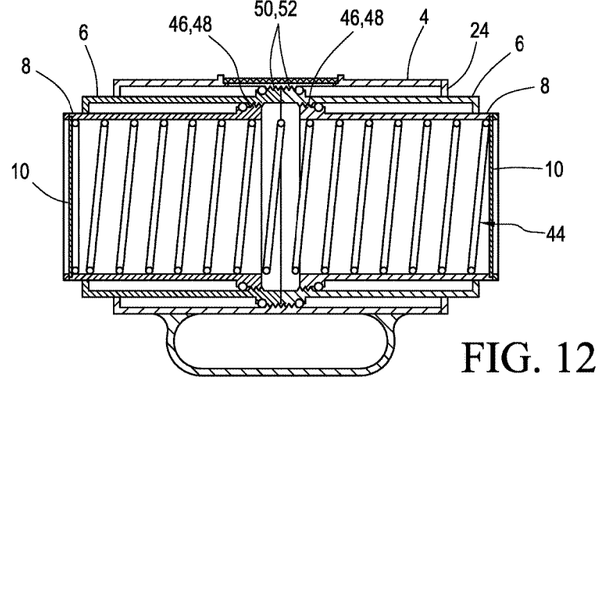
FIG. 12 is a cross-sectional view similar to FIG. 11, showing the device in a retracted position.
Figure 13:
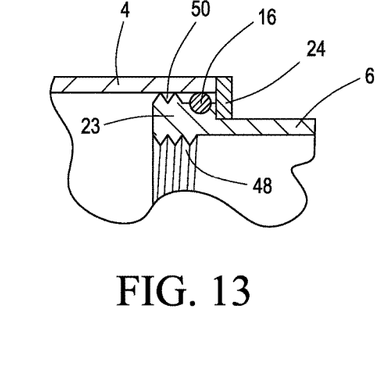
FIG. 13 is an enlarged cross-sectional view of detail C in FIG. 11.

Referring to FIGS. 11, 12 and 13, a spring 44 may be provided inside the device 2 to advantageously aid in extending the tubular member 6 and 8 for deployment. When retracted, the spring 44 is compressed and the tubular members 6 and 8 are threaded to the respective threads. Male threads 46 at an inner end portion of the tubular members 8 are configured to thread with female threads 48 on the inside surface at the inner end portions of the tubular members 6. Male threads 50 on the outer surface of the inner end portion of the tubular member 6 are configured to thread with female threads 52 at the inner surface on the central portion of the tubular member 4.

With the provision of the threads 46, 48, 50 and 52, the extended length of the device 2 may be advantageously varied, depending on the distance from the user of the desired information being viewed. For example, starting from the completely retracted position, as shown in FIG. 12, there are four possible extended lengths, proceeding from left to right, the tubular member 8 extended, the tubular member 6 extended, the other tubular member 6 extended and finally the other tubular member 8 extended.

The female threads 48 and 52 may also be provided in the embodiment shown in FIG. 7 to mate with the corresponding male threads 36 when the tubular members are retracted to lock the corresponding tubular members 6 and 8 at the desired length during use. The provision of the threads 48 and 52 in the embodiment of FIG. 7 will provide to lock the tubular members 6 and 8 to the tubular member 4 when the device is completely retracted for stowage.

Figure 14:
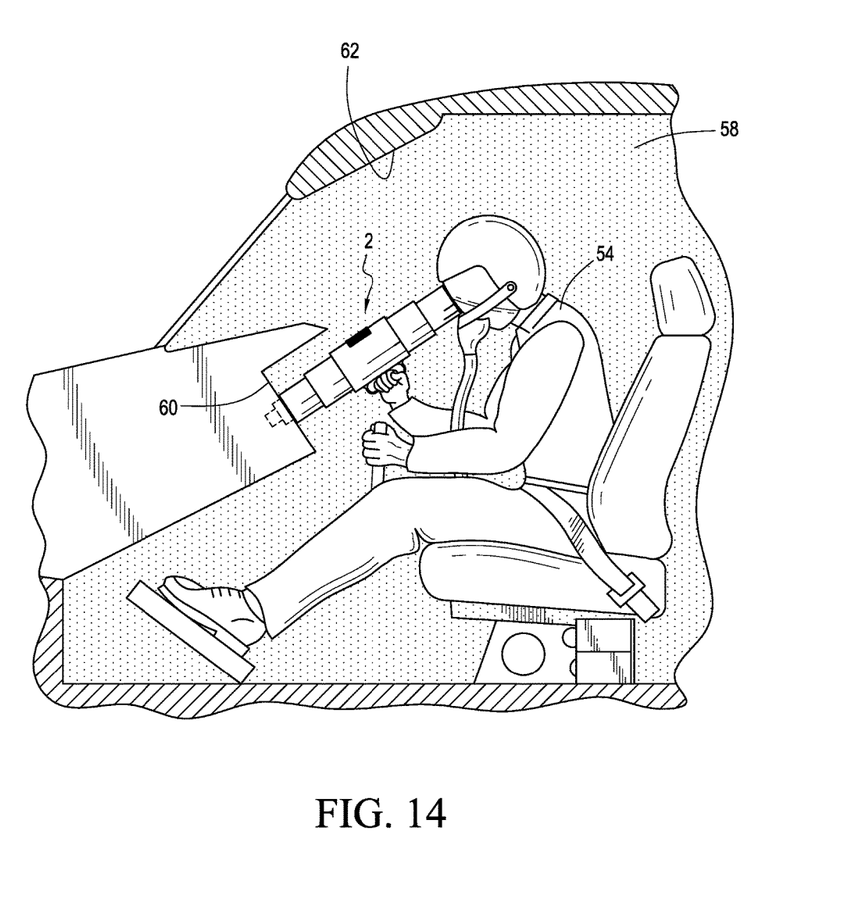
FIG. 14 is an illustration of the device of the present invention, shown being used during a smoke emergency inside a cockpit.

Referring to FIG. 14, a user 54, such as a pilot inside a cockpit 56 filled with smoke 58, directs the device 2 in the extended position to an instrument panel 60 to read information from it to help pilot the aircraft to a safe landing. With the use of the device 2, the pilot is able to see the instrument panel 60 in spite of the smoke in the cockpit. If the pilot desires to look at a switch at an overhead panel 52, the pilot may have to shorten the length of the device 2 due to a shorter distance to the overhead panel 62 by retracting one of the tubular members 6 and 8.

Figures 15, 16:
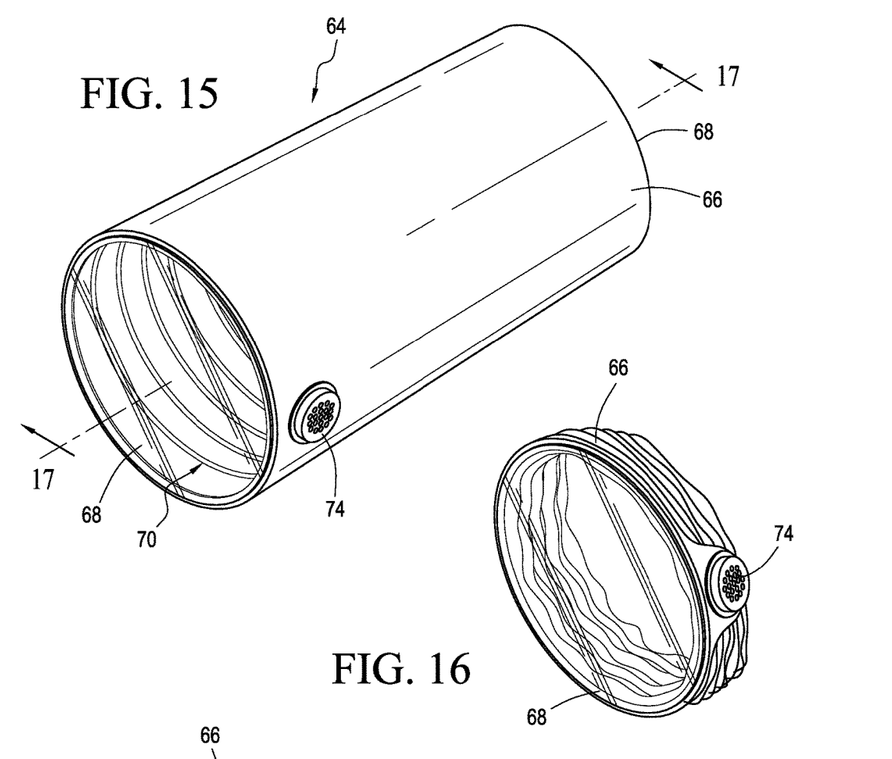
FIG. 15 is a perspective view of another embodiment of a hand-held emergency vision device made in accordance with the present invention, shown in an expanded form.
FIG. 16 is a perspective view of the device in FIG. 15, shown in a compact form for stowage.
Figure 17:
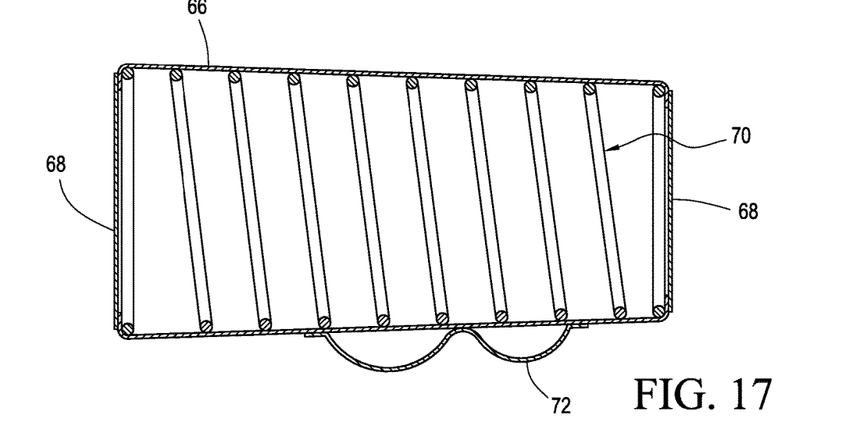
FIG. 17 is a cross-sectional view elevational view along line 17-17 in FIG. 15.
Figure 18:
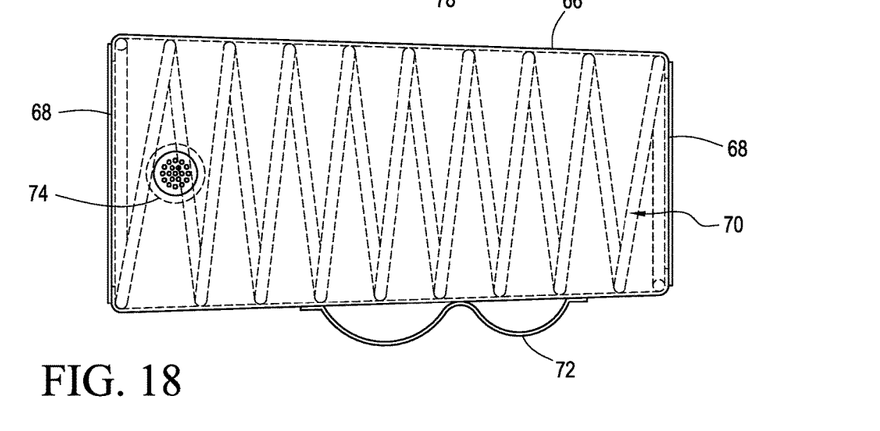
FIG. 18 is a side elevational view of the device shown in FIG. 15.

Referring to FIGS. 15, 16, 17 and 18, another embodiment of an emergency vision device 64 is disclosed. The device 64 is expandable during use, as shown in FIG. 15 and compressible for storage, as shown in FIG. 16. The device 64 decreases in cross-sectional area from one end to the opposite end, as shown in FIG. 17, to advantageously provide a thinner configuration when flattened to a compact form, since the smaller cross-sectional areas will be accommodated within the larger cross-sectional areas when flattened to a compact form. The device 64 is tubular, preferably conical in shape. The device 64 has a sidewall 66 made of flexible material suitable for folding. A clear member 68 is disposed at each end of the device 64 to allow the user to see through the device from one end to the other end during a smoke emergency. The sidewall 66 may made of clear or translucent material to provide the outside ambient lighting to reach inside the device and provide lighting toward the object being viewed. A spiral spring 70, generally conical as seen from the side, is operably attached to the sidewall 66. The spring progressively decreases in diameter from one end to the other end of the device 64 so that when the device is flattened to a compact form for storage, the smaller diameter portions of the spring 70 will tend to be received with the larger diameter portions of the spring, thereby providing a thinner configuration when flattened to a compact form. A strap 72 made of flexible material is attached to the sidewall 66 to provide the function of a handle for the user during use. A filter 74 is operably associated with the outside and the inside of the device 64 so that when the device is expanded, air from the environment is filtered and flows through the filter 74 into the inside space of the device 64. When the device 64 is flattened to a compact form for storage, air inside is forced through the filter 74, advantageously dislodging some of the particles trapped in the filter, thereby providing a cleaning action. The filter 74 is configured to filter smoke particles or other particulate matter from the outside so that clear air is allowed inside the device 64.

Figures 19, 20:
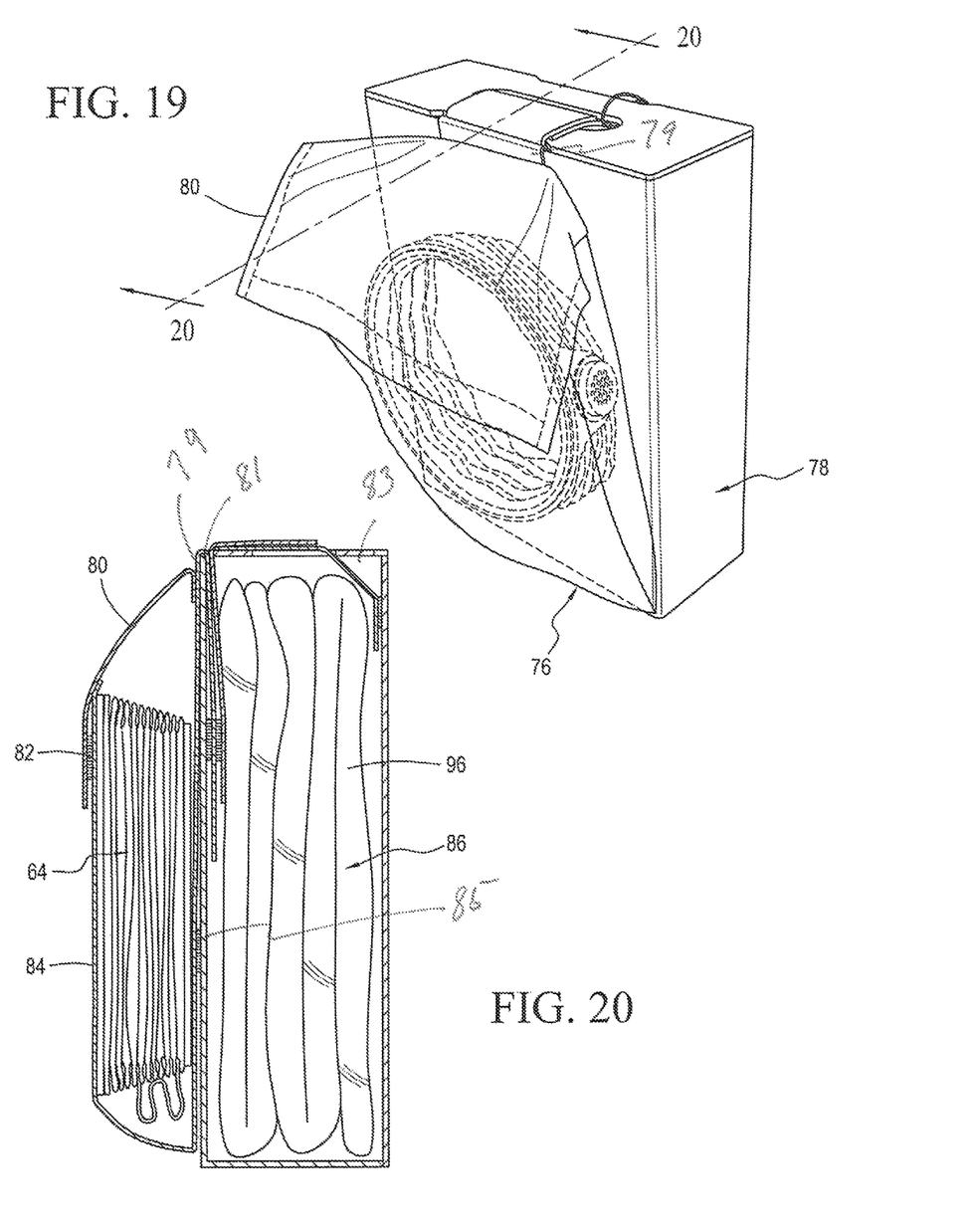
FIG. 19 is a perspective of a system, showing the hand-held device of FIG. 15 stored in a pouch attached to a housing of a main emergency vision apparatus.
FIG. 20 is a cross-sectional view taken along line 20-20 in FIG. 19.
Figure 21:
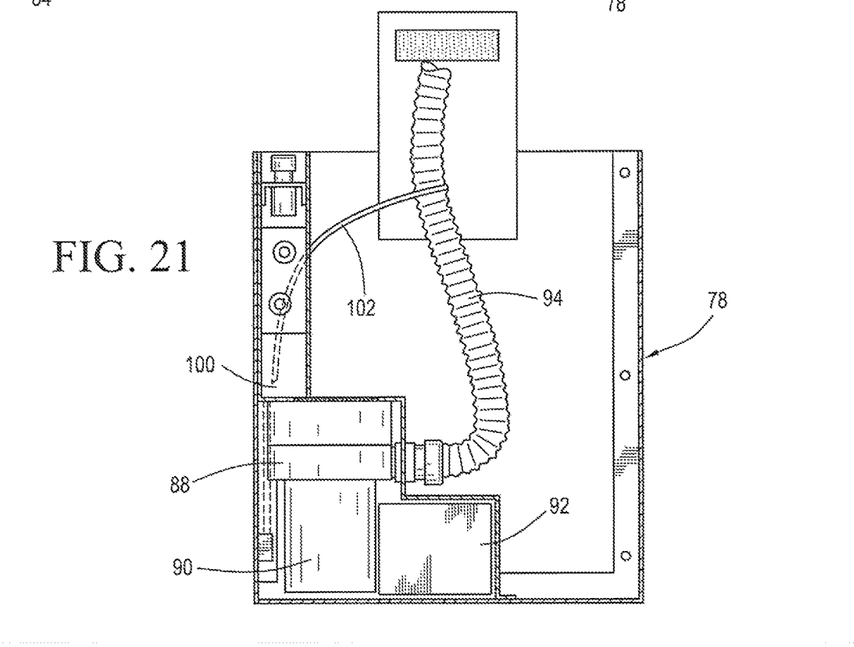
FIG. 21 is a cross-sectional view taken along line 21-21 in FIG. 23.

Referring to FIGS. 19 and 20, the device 64 may be stowed in a pouch 76 attached to a housing 78. Although only shown for the device 64, it should be understood that the device 2 may also be stored in the pouch 76. The pouch 76 includes a flap 80 attached with a fastener 82 to a front wall 84. The fastener 82 is removably attachable, such as a VELCRO (registered trademark) fastener. The pouch includes a strap 79 disposed over an edge 81 of an opening 83 of the housing 78 (see also FIG. 23). The strap 79 is attached to an inside surface 85 of the housing.

The housing 78 includes an emergency vision apparatus 86 as disclosed in U.S. Pat. No. 5,947,415, hereby incorporated by reference. The apparatus 86 includes a blower 88, a motor 90 operably connected to the blower 88, a battery 92 operably connected to the motor 90, a hose 94 operably connected to the blower 88 and an inflatable vision unit 96 (see FIG. 22) operably connected to the hose 94. The unit 96 is inflated by the blower 88 via the hose 94 when in use. The unit 96 includes clear members 91, 93 and 95 to allow the user to see through the windshield 97 and instrument panel 98. When not in use, the unit 96 is folded and stored inside the housing 78.

Figure 22:
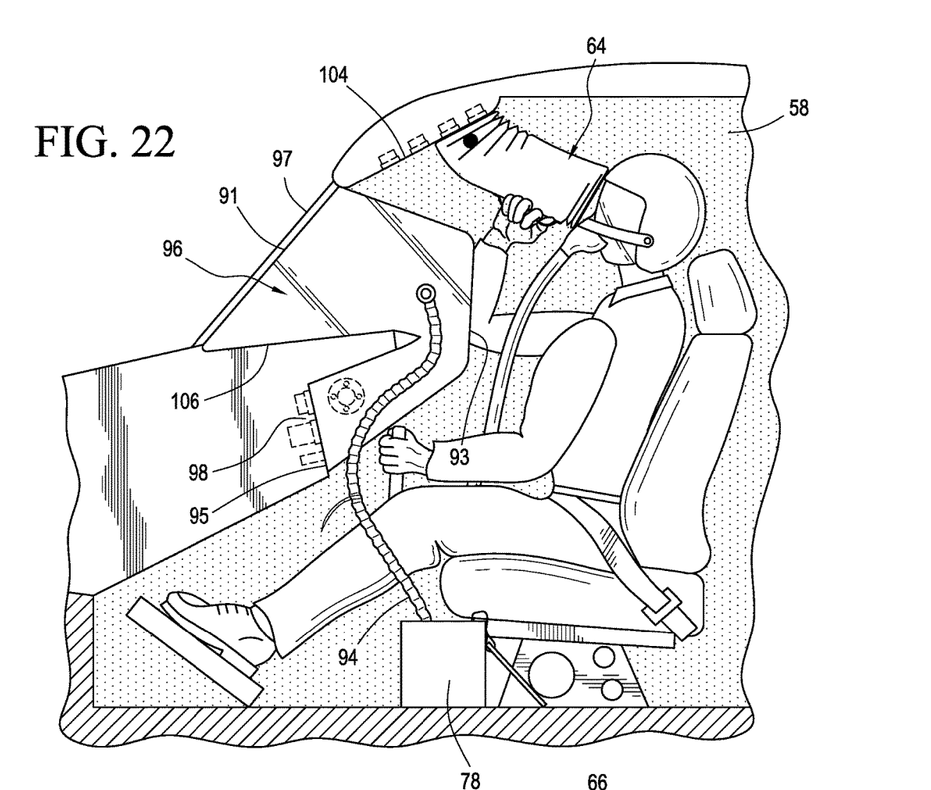
FIG. 22 is an illustration of the system shown in FIG. 19, shown being used during a smoke emergency inside a cockpit.

Referring to FIG. 22, the unit 96 allows the pilot to see outside the cockpit through the windshield 97 via the clear members 91 and 93 and to the instrument panel 98 via the clear members 93 and 95 during a smoke emergency when normal visibility within the cockpit is substantially impaired. A switch 100 for activating the blower 88 is automatically turned on by a removable member 102 when the unit 96 is taken out of the housing 78. The unit 96 is fixed in place once it is deployed. In order to see other areas in the cockpit not encompassed by the unit 96, the device 64 is used, allowing the user to view other areas of the cockpits, such as the overhead panel 104. Since the device 64 is hand-held, it can be readily moved to view any areas within the cockpit within reach.

Figure 23:
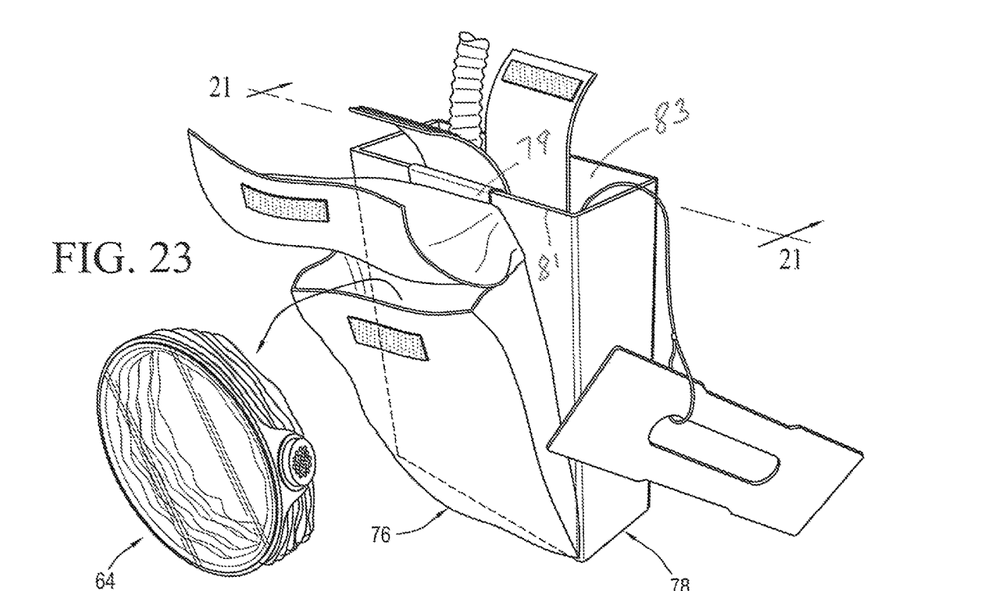
FIG. 23 is a perspective view showing the hand-held device of FIG. 15, shown in the compact form being taken out of the pouch and the housing of the main emergency vision apparatus opened to deploy the main emergency vision apparatus.

Referring to FIG. 23, the unit 96 is taken out of the housing 78 during a smoke emergency. The unit 96 starts to inflate as soon as the member 102 is removed from the switch 100, activating the blower 88. The unit 96 is then positioned over the glare shield 106. The device 64 may then be removed from the pouch 76. The device 64 will tend to expand from the action of the spring 70. For the device 2, the tubular members 6 and 8 may be manually extended and then locked in the extended position. The provision of the spring 44 will advantageously assist in the extension of the device 2.

Other collapsible support may be used with the device 64 in lieu of the spring 70. For example, a plurality of rings may be placed outside around the sidewall 66, the rings being supported and captured by a plurality of telescoping rods placed longitudinally of the sidewall. The rings have oversized holes along their circumference through which the telescoping rods are extended. The rings are also attached to the sidewall 66 at regular distances along the axial length of the device. The telescoping rods are similar to telescoping car antennas. When the device is flattened to a compact form, the telescoping rods are retracted and the rings are drawn together. When the device 64 is expanded, the telescoping rods are extended and the rings are separated apart. One of the telescoping rods can serve as handle during use. The telescoping rods can be extended to any length between the compact flattened form to the fully extended form, thereby giving the user the flexibility of having the device 64 at various lengths as desired.

The device 64 in combination with the apparatus 86 advantageously provides the user the capability to see sources of information within reach inside the cockpit.

Although the devices 2 and 64 are shown with a circular cross-section, it should be understood that any cross-sectional shape would be applicable as long as a clear visibility path is provided through the device.

Figure 24:
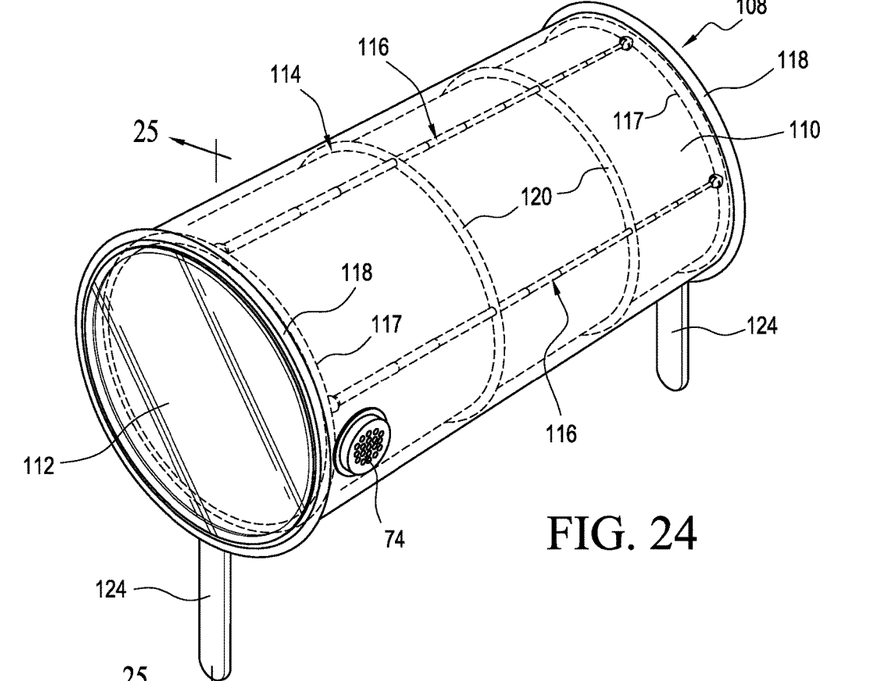
FIG. 24 is a perspective view of another embodiment of a hand-held emergency vision device made in accordance with the present invention, shown in an expanded form.
Figure 25:
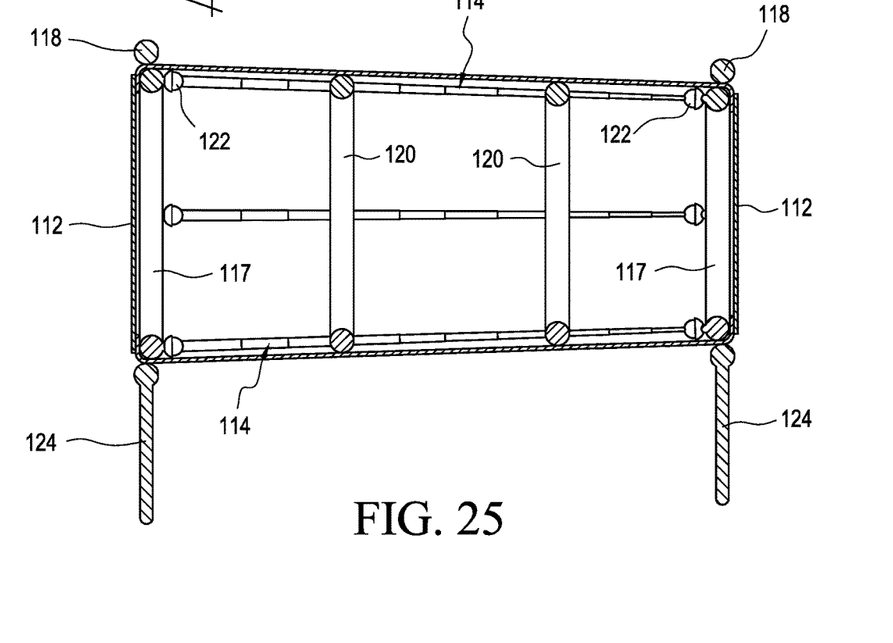
FIG. 25 is a cross-sectional view taken along line 25-25 in FIG. 24.
Figures 26, 27:
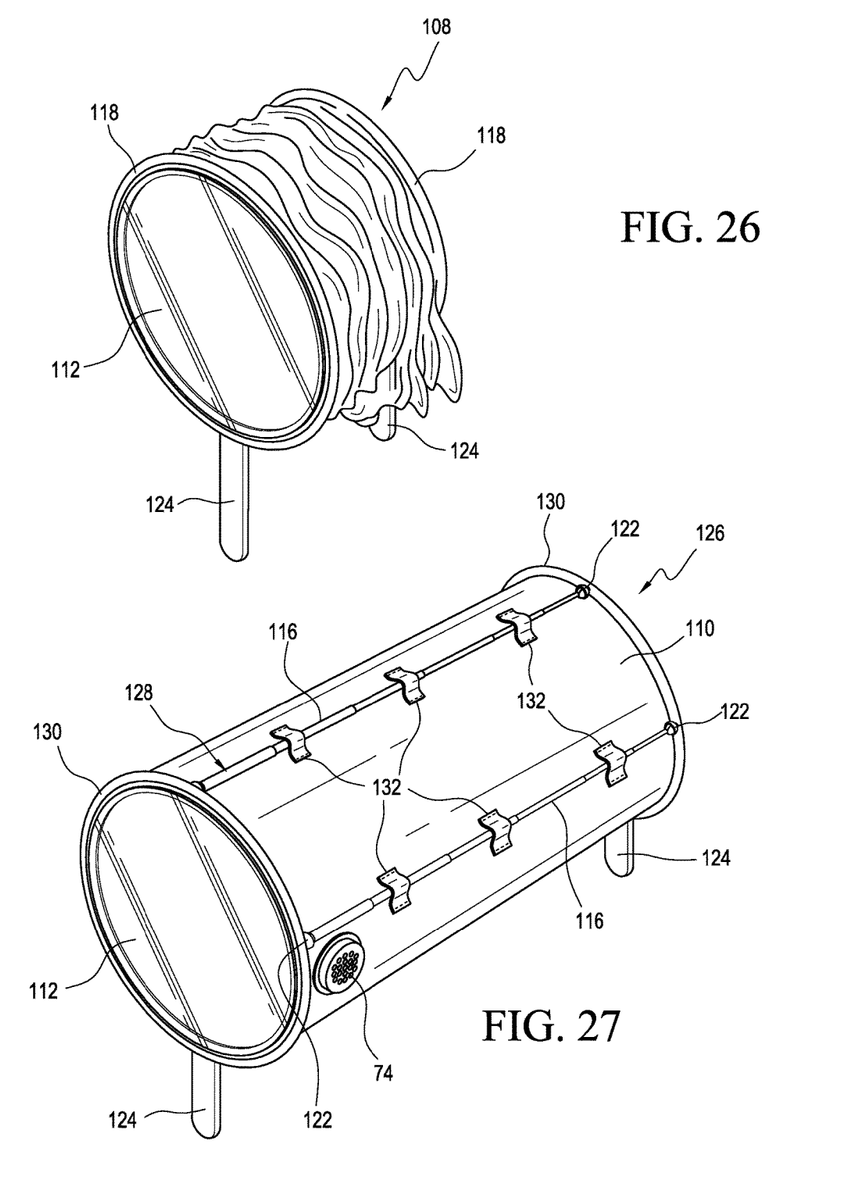
FIG. 26 is a perspective view of the device of FIG. 24 shown in a compact form for stowage.
FIG. 27 is a perspective view of another embodiment of a hand-held emergency vision device made in accordance with the present invention, shown in an expanded form.

Referring to FIGS. 24-26, another embodiment of an emergency vision device 108 is disclosed. The device 108 is expandable during use and compressible for storage, as shown in FIG. 26. The device 108 decreases in cross-sectional area from one end to the opposite end, as shown in FIG. 25, to advantageously provide a thinner configuration when flattened to a compact form, since the smaller cross-sectional areas will be accommodated within the larger cross-sectional areas when flattened to a compact form. The device 108 is tubular with any cross-sectional shape, but preferably conical in shape.

The device 108 has a sidewall 110 made of flexible or foldable material. A clear member 112 is disposed at each end of the device 108 to allow the user to see through the device from one end to the other end during a smoke emergency. The sidewall 110 may made of clear or translucent material to provide outside ambient lighting to reach inside the device and provide lighting toward the object being viewed.

A framework 114 is disposed inside the side wall 110 provide support to the sidewall 110 when the device 108 is deployed for use. The framework includes a plurality of telescoping members 116 rotatably attached to frame members 117 disposed at each end of the device 108 and intervening frame members 120, which are preferably fixed to the telescoping members 116. The telescoping members 116 are preferably attached to the frame members 117 with swivel joints 122. The frame members 117 are operably attached to frame members 118 disposed outside the sidewall 110 at each end of the device. Each of the frame members 118 may be provided with a handle 124 for the convenience of the user when expanding preparatory to use, compacting for stowage or adjusting the length of the device 108 during use. The filter 74 provides clean air from the outside when the device is expanded for use. The framework 114 may also be disposed outside the side wall 110.

The sidewall 110 and the framework 114 are generally conical as shown in FIG. 25 to advantageously provide a compact configuration when deflated for stowage. The framework 114 progressively decreases in diameter from one end to the other end of the device 108 so that when the device is flattened to a compact form for storage, the smaller diameter frame members 120 of the framework 114 will tend to be received with the larger diameter frame members 120, thereby providing a thinner configuration when flattened to a compact form. The framework 114 can be further flattened by laterally displacing the frame members 118 relative to each other, similar to sliding one hand with respect to the other hand (see FIG. 29). The swivel joints 122 advantageously allow the telescoping members 116 to bend downwardly, upwardly or sideways when the frame member 118 are laterally displaced.

The device 108 when flattened may be stowed in a suitable container, such as the pouch 76 (shown in FIG. 19).

Figures 28, 29, 30:
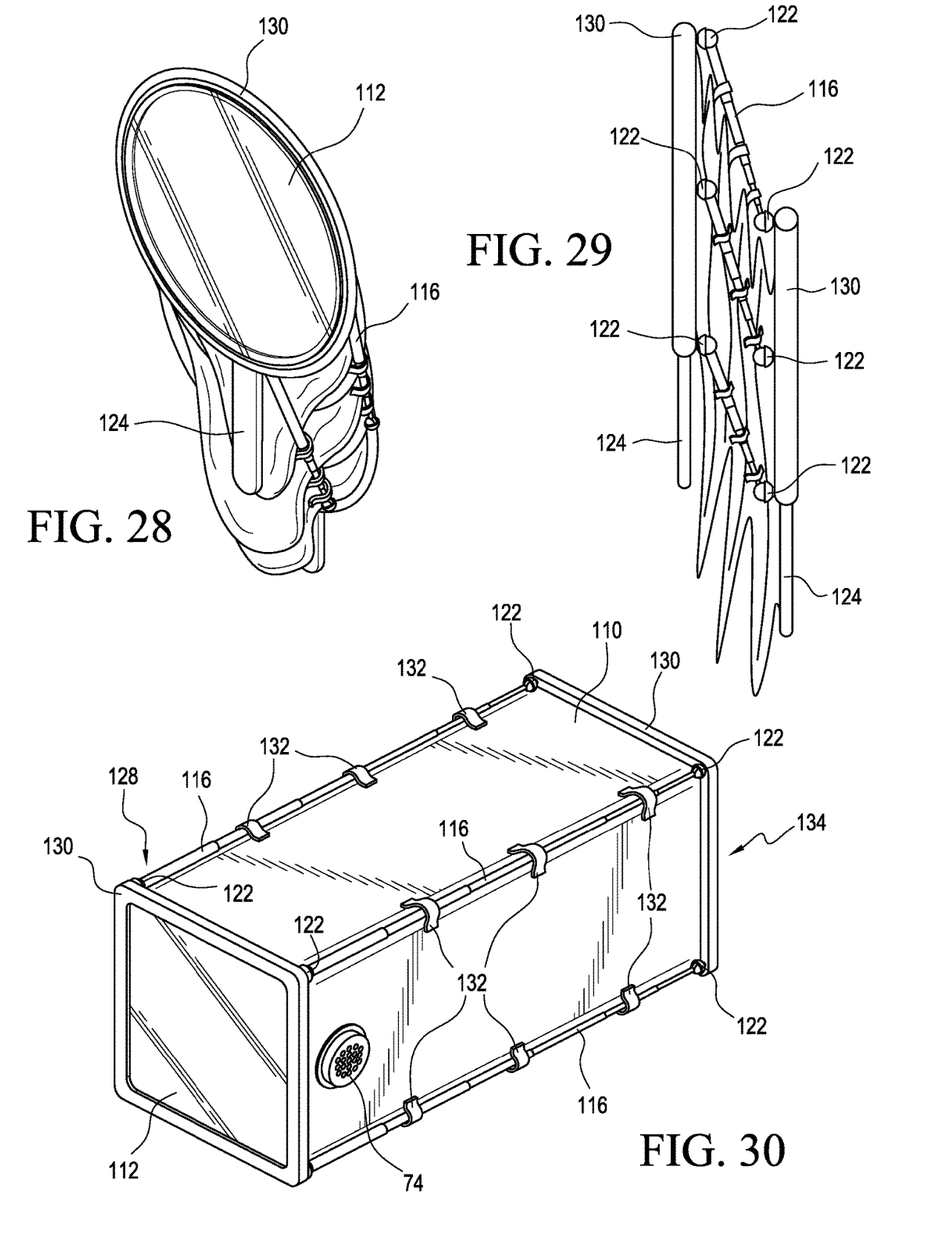
FIG. 28 is a perspective view of the device of FIG. 27 shown in a compact form for stowage.
FIG. 29 is a side elevational view of FIG. 28.
FIG. 30 is a perspective view of another embodiment of a hand-held emergency vision device made in accordance with the present invention, shown in an expanded form.

Referring to FIGS. 27-29, another embodiment of an emergency vision device 126 is disclosed. The device 126 is expandable during use and compressible for storage, as shown in FIGS. 28 and 29. The device 126 is tubular of any cross-sectional shape, but preferably conical in shape.

The device 126 has the sidewall 110 made of flexible or foldable material. The clear member 112 is disposed at each end of the device 126 to allow the user to see through the device from one end to the other end during a smoke emergency. The sidewall 110 may made of clear or translucent material to provide outside ambient lighting to reach inside the device and provide lighting toward the object being viewed.

A framework 128 is disposed outside the side wall 110 to provide support to the sidewall 110 when the device 126 is deployed for use. The framework 128 includes a plurality of the telescoping members 116 rotatably attached to frame members 130 disposed at each end of the device 126. The telescoping members 116 are preferably attached to the frame members 130 with the swivel joints 122. The frame members 130 at each end of the device may be provided with the handle 124 for the convenience of the user when expanding the device preparatory to use, flattening the device for stowage or adjusting the length of the device 126 during use. The filter 74 provides clean air from the outside when the device is expanded for use.

Straps 132 are attached to the sidewall 110 and the telescoping members, which slide underneath the straps when extending or retracting the device 126. The framework 128 may also be disposed within the sidewall 110 in the interior space of the device, as shown for the device 108. The straps 132 will then be attached to the inside surface of the sidewall 110.

The sidewall 110 and the framework 128 are generally conical, similar to the device 108, to advantageously provide a compact configuration when deflated and flattened for stowage. The framework 128 can be further flattened by laterally displacing the frame members 130 relative to each other, similar to sliding one hand with respect to the other hand, as shown in FIG. 29. The swivel joints 122 advantageously allow the telescoping members 116 to bend downwardly when the frame members 130 are laterally displaced.

The device 126 when flattened may be stowed in a suitable container, such as the pouch 76 (shown in FIG. 19).

Referring to FIG. 30, another embodiment of an emergency vision device 134 is disclosed. The device 134 is similar to the device 126, but with a rectangular cross-section. The device 134 works in the same manner as the device 126. The framework 128 may also be disposed inside the device 134, as in the device 108.

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, in FIG. 14, the instrument or control panel 60 may be disposed in an operator station within a control room in a submarine, nuclear power plant, or other critical areas. In this case, to continue to operate, the operator must have visual access to the instrument or control panel in case smoke invades the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A hand-held emergency vision apparatus, comprising:
   a) an enclosed tubular structure having opposite first and second ends;
   b) first and second clear members disposed at respective said first and second ends;
   c) said structure including a plurality of tubular members retractable to a shorter length and extendable to one of several lengths, said tubular members are rigid and sealed from the outside air;
   d) a filter operably associated with said tubular structure to filter the outside air such that when said tubular structure is extended from said compact form air the outside air is forced through the filter and clean air enters said tubular structure;
   e) said plurality of tubular members including a first tubular member having first and second ends with respective first and second openings, a second tubular member telescopingly retractable into and telescopingly extendable from within said first tubular member at said first opening, a third tubular member telescopingly retractable into and telescopingly extendable from within said first tubular member at said second opening.

2. A hand-held emergency vision apparatus as in claim 1, wherein:
   a) said second tubular member includes a pin;
   b) said first tubular member includes an L-shaped groove; and
   c) said pin is disposed and slidable in said groove.

3. A hand-held emergency vision apparatus as in claim 2, wherein said groove includes an axial portion and a circumferential portion.

4. A hand-held emergency vision apparatus as in claim 2, wherein:

a) said pin is attached to said second tubular member and extends radially outwardly from said second tubular member; and
b) said groove is disposed on an inside wall surface of said first tubular member.

5. A hand-held emergency vision apparatus as in claim 1, and further comprising a handle disposed on said first tubular member.

6. A hand-held emergency vision apparatus as in claim 1, wherein said filter is operably associated with said first tubular member.

7. A hand-held emergency vision apparatus as in claim 1, wherein:
a) said second tubular member includes male thread;
b) said first tubular member includes female thread; and
c) said male thread is engageable with said female thread when said first and second tubular members are extended from one another to lock said second tubular member to said first tubular member.

8. A hand-held emergency vision apparatus as in claim 7, wherein:
a) said male thread is disposed on an outside circumferential edge portion of said second tubular member; and
b) said female thread is disposed on an inside circumferential edge portion of said first tubular member.

9. A hand-held emergency vision apparatus as in claim 1, and further comprising a spring operably associated with the tubular members to aid in deployment.

10. A hand-held emergency vision apparatus, comprising:
a) a collapsible tube made of airtight material and having an expanded form and a compact form, said tube decreasing in cross-sectional area from one end to an opposite end;
b) first and second clear members disposed at respective first and second ends of said tube to enable the user to see through said tube and observe a source of information at the other end while smoke is in the environment;
c) a filter operably associated with said tube to filter the ambient atmosphere and fill the interior of said tube with clear air when said tube is expanded to its expanded form;
d) a collapsible support operably secured to said tube, extending from one end of said tube to the other end, adapted to expand said tube to its expanded form and thereby to draw ambient air through said filter into said tube; and
e) said collapsible support including a plurality of extendable and retractable telescoping members disposed longitudinally of said tube.

11. A hand-held emergency vision apparatus as in claim 10, wherein said tube is conical.

12. A hand-held emergency vision apparatus as in claim 10, and further comprising:
a) a housing for an emergency vision apparatus;
b) a pouch attached to said housing; and
c) said tube in said compact form is disposed in said pouch.

13. A hand-held emergency vision apparatus as in claim 10, wherein:
a) said support includes first and second frame members disposed at respective said first and second ends; and
b) first and second ends of said telescoping members are rotatably attached to respective said first and second frame members.

14. A hand-held emergency vision apparatus as in claim 13, and further comprising:
a) interior frame members disposed between said first and second frame members; and
b) said interior frame members are attached to said telescoping members.

15. A hand-held emergency vision apparatus as in claim 13, wherein said first and second frame members are laterally displaceable relative to each.

16. An emergency vision system, comprising:
a) a housing including a side wall with an exterior surface;
b) a main inflatable enclosure having an inflated state and a deflated state, said main inflatable enclosure in said deflated state is disposed in said housing, said main inflatable enclosure in said inflated state is configured to be stationarily disposed between a user and a source of information required to be seen by the user during a smoke emergency;
c) a container attached to said exterior surface of said side wall;
d) said container including a strap disposed over an edge of an opening of said housing and attached to an inside surface of said housing; and
e) a movable hand-held enclosure having an inflated state and a deflated state, said hand-held enclosure in said deflated state is disposed inside said container, said movable hand-held enclosure in said inflated state is configured to be used by the user to view a second source of information not visible through said main inflatable enclosure.

17. An emergency vision system as in claim 16, wherein said hand-held enclosure includes a collapsible support comprising a spiral spring.

18. An emergency vision system as in claim 16, wherein said hand-held enclosure includes a collapsible support comprising a plurality of extendable and retractable telescoping members.

* * * * *